United States Patent [19]

Siegmund, Jr.

[11] 3,850,664

[45] Nov. 26, 1974

[54] BARRIER COAT METHOD OF COATING SUBSTRATES WITH CORROSION RESISTANT COATINGS

[75] Inventor: Alfred J. Siegmund, Jr., Houston, Tex.

[73] Assignee: Napko Corporation, Houston, Tex.

[22] Filed: June 12, 1972

[21] Appl. No.: 261,964

[52] U.S. Cl.............. 117/18, 117/21, 117/29, 117/75, 117/132 BE, 117/171 ZB
[51] Int. Cl............................................. B44d 1/094
[58] Field of Search..... 117/18, 21, 29, 75, 132 BE, 117/161 ZB

[56] References Cited
UNITED STATES PATENTS

| | | | |
|---|---|---|---|
| 2,579,330 | 1/1951 | Martin | 260/613 |
| 2,579,331 | 1/1951 | Martin | 260/33.2 |
| 3,008,848 | 11/1961 | Annonio | 117/21 X |
| 3,023,189 | 2/1962 | Jupa | 117/75 X |
| 3,098,059 | 7/1963 | Van Strien et al | 117/132 BE |
| 3,161,530 | 12/1964 | Strobel | 117/18 |
| 3,384,610 | 5/1968 | Lee | 117/21 X |
| 3,479,204 | 11/1969 | Louelock | 117/75 X |
| 3,508,946 | 4/1970 | Plueddemann et al | 117/18 |
| 3,578,615 | 5/1971 | Moore et al | 117/21 |
| 3,687,706 | 8/1972 | Stanley et al | 117/18 |

Primary Examiner—Ralph Husack
Assistant Examiner—Shrive P. Beck
Attorney, Agent, or Firm—James P. Dowd

[57] ABSTRACT

A process for coating a steel substrate with a corrosion resistant film. This process consists of applying a liquid phenolic epoxy film to the heated substrate allowing this film to dry for a very short time, then applying a secondary coat consisting of a powdered epoxy resin containing a suitable crosslinking agent, and baking both at an elevated temperature to complete the cure.

5 Claims, No Drawings

BARRIER COAT METHOD OF COATING SUBSTRATES WITH CORROSION RESISTANT COATINGS

FIELD OF THE INVENTION

This invention relates to novel methods of coating metal substrates to provide coatings of great chemical resistance and, more particularly, coating having superior resistance to those chemicals which are generated by the electric current used to prevent steel objects from corroding.

DESCRIPTION OF THE PRIOR ART

Powdered protective coatings have come into wide usage in recent years for protecting underground pipelines. These coatings consist of finely divided mixtures of solid epoxy resins, pigments and crosslinking agents. These mixtures are generally applied to the substrate to be protected by means of electrostatic spraying equipment. They are then heated to cause the powder to fuse into a homogenous film.

These coatings, when applied to underground pipelines, are secondarily protected by connecting the pipe to the negative terminal of a direct current voltage source. The positive terminal is generally buried in the soil adjacent to the pipe. This current causes the decomposition of naturally occurring inorganic salts in the soil. These decomposition products are extremely corrosive to most organic resinous materials.

In addition, these coatings must possess excellent adhesion and flexibility.

The prior art has sought to overcome these deficiencies by manipulation of the crosslinking agents used to cure the powder. This is unsatisfactory since it generally causes loss of coating flexibility and the ability of the coating to fuse to a homogenous, continuous film is impaired.

SUMMARY OF INVENTION

In accordance with the present invention, there is provided a flexible coating having extremely good chemical resistance.

The coating system is applied substantially in two steps. The first step consists of application of a liquid barrier coat to the preheated substrate, in the range of 400°-500°F, allowing the barrier coat to dry and immediately overcoating the barrier coat with a powdered epoxy resin coating.

DESCRIPTION OF PREFERRED EMBODIMENTS

The coating consists of a liquid barrier coat in conjunction with a powder topcoat derived from bisphenol A and epichlorohydrin. The barrier coat is prepared by dissolving the binder material which consists of an epoxy resin, an acid catalyst and a phenolic intermediate in a solvent consisting substantially of ethyleneglycolmonoethylether acetate.

The phenolic intermediate useful in this invention has a structure essentially as follows:

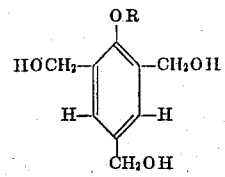

Where R represents an unsaturated aliphatic group, this class of materials is described in U.S. Pat. No. 2,579,330. The preferred material is alloxy trimethylol phenol. The article of commerce representing this compound is Methylon R-108, a product of General Electric.

The preferred epoxy resin used in this invention should be solid at room temperature. It has a melting point of 125°–135°C as determined by the Durran melting point method. Between 2,000–2,500 grams of resin contain 1 gram equivalent of epoxide.

This resin is commonly prepared from bisphenol A and epichlorohydrin.

Between 30 and 40 percent of the total nonvolatile resin composition should be composed of the previously described phenolic intermediate. The remainder should be the above described epoxy resin. In order to achieve the very rapid process times necessary in the automated coating of pipe it is necessary for the barrier coat to dry very rapidly. It was unexpectedly found that high concentrations of phosphoric acid added to the resin mixtures would result in rapid drying of the barrier coat. A minimum of 1 percent phosphoric acid was found necessary to achieve this fast dry. These ratios have not been found useful in prior art.

The powder coating of this invention consists of finely divided mixtures of epoxy resin and hardener. The epoxy resin useful in this invention is the reaction product of bisphenol A and epichlorohydrin. It has an epoxide equivalent of 875–1,000 and a softening point of 95°–165°C by the Durran mercury method.

The hardener of this invention is trimellitic anhydride. Between 10 and 13 parts of trimellitic anhydride per hundred parts of epoxy resin should be present for optimum cure.

EXAMPLE 1 BARRIER COAT

| Component A Mill Paste | pounds |
|---|---|
| Yellow iron oxide | 6.63 |
| Calcium sulfate | 6.96 |
| 1,2 epoxy resin (softening point 130°C) | 4.25 |
| epoxy equivalent 2000 prepared from bisphenol A and epichlorohydrin | |
| Allyloxy trimethylolphenol | 1.40 |
| Ethylene glycolmonoethyl ether acetate | 1.53 |

The above ingredients were mixed and ground with a pebble mill until smooth and uniform.

| Component B Reduction | pounds |
|---|---|
| 1,2 epoxy resin (softening point 130°C) | 18.96 |
| Allyloxy trimethylol phenol | 9.69 |
| ethyleneglycolmonoethyletheracetate | 40.08 |
| phosphoric acid (85% aqueous solution) | .50 |
| The ratio of phosphoric acid to the total solids in this example is | 1.5% |

The epoxy resin and the trimethylol phenol were dissolved in the ethyleneglycolmonoethyletheracetate. The phosphoric acid solution was then added. Component A was then mixed with Component B.

EXAMPLE 2

Barrier Coat

| Component A (Vehicle) | pounds |
|---|---|
| ethyleneglycolmonoethyletheracetate | 496.34 |
| 1,2 epoxy resin (softening point 130°C) | 183.47 |
| allyloxy trimethylol phenol | 69.06 |
| phosphoric acid (85% in water) | 3.46 |
| polyacrylate leveling agent (Monsanto Chemical PC 1344 promotes formation of a continuous film) | .68 |

Charge all ingredients into a tank equipped with a high speed agitator. Agitate until all of the 1,2 epoxy resin is dissolved. Allow the mixture to age 24 hours.

| Component B Grind Paste | pounds |
|---|---|
| component A (above) | 299.67 |
| calcium sulfate | 57.69 |
| chromium oxide green | 114.50 |

Disperse the above mixture with a sandmill until a 6 grind has been achieved, then mix with the reduction solvents which consist of:

| Component A and add | 453.31 lbs. |
|---|---|
| ethyleneglycolmonoethyletheracetate | 56.70 lbs. |

The ratio of phosphoric acid to the total binder solids in this example is 1.12.

EXAMPLE 3

The Powder Coat

| | pounds |
|---|---|
| Epoxy resin derived from bisphenol A and epichlorohydrin (melting point 95-105 epoxide equivalent 875-1000) | 1757.0 |
| trimelletic anhydride (a coreactive hardener) | 170.0 |
| red iron oxide | 60.0 |
| silica (325 mesh) | 263.0 |
| Monsanto PC-1344 (flow control agent) | 2.0 |
| pyrogenic silica | 21.0 |

The above ingredients were charged into a pebble mill and ground 2¾ hours. The resulting powder was then screened through an 80 mesh screen to remove coarse particles.

EXAMPLE 4

Fast Curing Powder Coating

| | pounds |
|---|---|
| 1,2 epoxy resin (melting point 95-164°C epoxide equivalent 875-1000) | 845.0 |
| trimelletic anhydride | 65.0 |
| red iron oxide | 29.0 |
| silica (natural 325 mesh) | 125.0 |
| stannous octoate | 4.2 |
| Monsanto PC 1344 (flow control agent) | .9 |
| pyrogenic silica | 10.7 |

The above ingredients were charged into a pebble mill and ground 4 hours. The resulting epoxy powder was then screened through a 80 mesh screen to remove particles.

EXAMPLE 5

Preparation of Coating Systems

A steel pipe was heated to 450°F. The barrier coat of example 1 was sprayed on the exterior of the hot pipe and allowed to dry for 60 seconds. The pipe was then sprayed with the powder coating of example 4 and baked for 90 seconds at 475°F. It was then cooled with a water spray.

Test of coating for corrosion resistance, one 3/32 inch hole was drilled so as to penetrate the coating and expose the bare steel substrate. A 3 inch diameter open ended glass cylinder was then cemented over the hole so as to form a cylindrical vessel with the coating serving as the bottom. The cylinder was then filled with 3 percent aqueous sodium chloride solution. One end of a platinum wire was immersed in the sodium chloride solution. The other end of the platinum wire was connected to the positive terminal of a 6 volt dry cell. The negative terminal of the cell was connected to an uncoated portion of the pipe. Bubbles were immediately observed to be emanating from the hole in the coating. The test was allowed to continue for 30 days. The test cell was then dismantled. A knife was used to remove loose, nonadherent coating around the 3/32 inch hole. It was observed that only 8/32 inch of coating could be removed with the knife.

A similar pipe was prepared without the barrier coating but using the powder described in example 4 and tested in the same manner. Over 22/32 inch of pipe was removed at the end of the 30 day period.

EXAMPLE 6

A 48 inch diameter steel pipe previously cleaned by metal grit air blasting was mounted on a conveyer. The pipe then traveled through an oven. When it emerged from the oven the surface temperature was measured and found to be 500°F. Immediately after emerging from the oven it was sprayed with the barrier coat of example 2. The pipe then passed in front of the powder application station where the powder of example 3 was applied by electrostatic spray. The pipe was then passed into a cooling station where it was cooled by jets of cold water. The pipe, thus coated, was fabricated into a gas transmission line, the line was put into gas transmission service buried in the ground, and given cathodic protection. The required amount of current was observed. After 3 years of service, the amount of electric current passing from the pipe to the soil was measured. It was found to be the same as when the pipe was initially installed. This indicates that virtually no degradation of the coating had occurred. Such a stability of current demand on buried pipe has not occurred using previously used coating systems.

What is claimed is:

1. The process of depositing on a metal surface an organic coating highly resistant to corrosive substances which comprises:
   1. heating the metal to an elevated temperature,
   2. applying a barrier coat consisting of a solution in ethyleneglycolmonoethyletheracetate of a binder consisting of between 30 and 40 percent by weight of a phenolic intermediate selected from the group having the formula

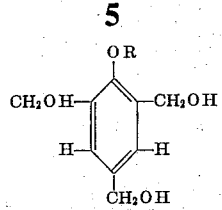

where "R" is an aliphatic unsaturated organic radical at least 3 carbon atoms in length, a solid 1,2 epoxy resin having a melting point of 125°C. and an epoxide equivalent of 2,000–2,500, and phosphoric acid, present at a concentration of between 1 and 5 percent of the total binder by weight, 3. allowing the barrier coat to dry at an elevated temperature and then applying a topcoating consisting of a powdered, solid epoxy resin containing trimellitic anhydride, and
4. curing said coating at an elevated temperature.

2. The process of claim 1 in which the barrier coat binder contains between 30 percent and 40 percent by weight of the phenolic intermediate of claim 1 wherein "R" is $CH_2 CH CH_2$.

3. The process of claim 1 in which the barrier coat phosphoric acid content is 3 percent of the binder.

4. The coating of claim 1 in which the topcoat consists of a mixture of a solid epoxy resin and trimellitic anhydride, the solid epoxy resin being the reaction product of bisphenol A and epichlorohydrin and having a softening point higher than 90°C.

5. The process of coating a pipe with a corrosion resistant coating, said process comprising:
1. heating the pipe to 450°F
2. Applying a liquid barrier coat comprising a solution in ethyleneglycolmonoethyletheracetate of a binder consisting of (a) between 30 and 40 percent by weight of a phenolic intermediate selected from the group having the formula:

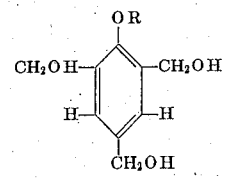

where "R" is an aliphatic unsaturated organic radical at least 3 carbon atoms in length, (b) a solid 1,2 epoxy resin having a melting point of 125°–135°C and an epoxide equivalent of 2,000–2,500, (c) between 1 and 5 percent by weight of phosphoric acid.

3. allowing the barrier coat to dry for a period not to exceed 90 seconds,
4. applying a topcoat consisting of a powdered epoxy resin and a hardner, said hardner being present at a ratio of between 10 and 15 parts by weight per hundred parts by weight of epoxy resin, and
5. baking the barrier coat and topcoat for 90 seconds at 475°F.

* * * * *